United States Patent

[11] 3,620,368

| [72] | Inventors | William P. Comis<br>Ridgewood;<br>Lawrence E. White, Waldwick, both of N.J. |
|---|---|---|
| [21] | Appl. No. | 829,520 |
| [22] | Filed | June 2, 1969 |
| [45] | Patented | Nov. 16, 1971 |
| [73] | Assignee | Dart Industries, Inc.<br>Los Angeles, Calif. |

[54] CLASSIFICATION OF DRY POLYMER BEADS
7 Claims, 3 Drawing Figs.

[52] U.S. Cl. .................................................. 209/2,
209/3, 209/401, 117/98, 117/132 CF
[51] Int. Cl. .................................................. B07b 1/04
[50] Field of Search .......................................... 209/2, 401,
3, 5, 233, 235; 117/98, 99, 132 CF, 128.4; 55/103

[56] References Cited
UNITED STATES PATENTS

| 2,785,768 | 3/1957 | Gauchard .................... | 55/103 X |
| 3,161,587 | 12/1964 | Bach ............................ | 209/11 X |
| 3,250,398 | 5/1966 | Adiletta ....................... | 210/500 X |
| 3,312,351 | 4/1967 | Kasten ......................... | 210/307 |
| 3,485,364 | 12/1969 | Burrough .................... | 209/245 |

OTHER REFERENCES

Allen, " Kill Static in Lab Screening," Chem. Eng., Sept. 22, 1958 p. 176

*Primary Examiner*—Frank W. Lutter
*Assistant Examiner*—William Cuchlinski, Jr.
*Attorneys*—Ronald J. Carlson, Fred S. Valles and Richard A. Dannels, Jr.

ABSTRACT: A method for classifying dry polymer beads according to size comprises feeding the beads to a screening zone which is equipped with at least one screen having its surface composed of a material such as poly (tetrafluorethylene) which has a dielectric constant similar to that of the polymer and having openings of the desired size, passing the beads across the surface of the screen and passing a portion of the beads through the openings. As a result of this method, the beads are substantially free of a charge of static electricity and the portion passes through the openings in the screen without significantly blinding the openings.

PATENTED NOV 16 1971 3,620,368

INVENTORS.
WILLIAM P. COMIS
LAWRENCE E. WHITE

BY Richard A Dannells Jr.
ATTORNEY

CLASSIFICATION OF DRY POLYMER BEADS

BACKGROUND OF THE INVENTION

This invention is directed to a method for classifying dry polymer beads. More particularly, it is directed to a method for classifying dry polystyrene beads that contain undesirable fines.

Substantially spherical particles or beads are formed in the suspension polymerization of polymerizable ethylenic monomers as described in Grim, U.S. Pat. No. 2,673,194. The resulting polymer beads have an average particle size, in the range from about 10 to 100 mesh. Average particle size, also called average particle diameter, is the diameter of a hypothetical particle of a size such that one-half of the material is smaller in particle size and one-half is larger than the hypothetical particle. In certain end use applications, polymer beads having a uniform particle size range are desirable. Therefore, means for classifying the beads according to size is required. One example of such an end use is foamable polymer compositions. Although the desired particular size for such an application depends on the particular process used to prepare the finished foamable polymer product, a common particle size range for foamable polystyrene compositions is from an upper size limit of about 20 mesh to a lower size limit of about 35 to 60 mesh. It has been found that for some types of foamable bead processes the preferred range of particle size is from about 20 to 40 mesh. A description of a method preparing foamable polystyrene compositions can be found in Platzer, U.S. Pat. No. 2,861,898.

Prior art methods do exist for obtaining foamable or expandable polystyrene beads without classification by a process in which the foaming agent or blowing agent is added before the styrene has been completely polymerized as described in Doak, U.S. Pat. No. 3,192,169. This patent discloses that by means of this process, foamable beads can be obtained which are substantially free of "fines," which are defined as any of the particles which are deemed of insufficient size for the process for which they are used. In the case of the preferred size range, fines are defined as those particles passing through a number 40-mesh sieve based on the U.S. Standard Sieve Numbers. HOwever, one must still classify the beads from this prior art process if one wants to have at least 90 percent of the beads pass through a 20-mesh screen and be retained on a 40-mesh screen. Other methods for obtaining a uniform bead size makes use of wet classification methods. Such processes have the inherent problem wherein a large number of beads form clusters or conglomerates.

Classification of dry polymer beads has been used in combination with processes as described in U.S. Pat. No. 3,192,169 which do not produce appreciable amounts of fines. In certain cases, either because of an upset in the process or because of the process itself, a large amount of fines is produced. This presents the problem of removing the fines from the desired beads. In certain instances, and for certain products, a partial solution to the problem in screening out materials of less than 20 mesh and preferably less than 40 mesh is the use of vibrating screens as disclosed in Gisler et al., U.S. Pat. No. 2,723,032. However, the use of vibration does not solve the problems associated with the classification of polymer beads to the desired size.

The heretofore unsolved problem with the screening of polymer beads containing at least a portion having a particle size of less than about 20 mesh and particularly less than 35 mesh was that the beads built up a charge of static electricity which in turn caused the beads to become electrostatically bonded one to another and bonded to the walls and openings of the screens themselves. This had the effect of forcing one to periodically stop the operation to clean the screens or to alternate between two screens with continual cleaning of the off-line classifier. This also had the effect of producing off-grade materials because of the carryover of fines into the product. This greatly increased the operating, maintenance and production costs.

It has been found in the classification of polymer beads having a size larger than 20 mesh that no appreciable buildup of static electricity occurred during the screening operation. Therefore, beads of this size can be classified without the attendant problems associated with the smaller beads. However, if appreciable amounts of beads to be classified have a size that is smaller than 20 mesh and especially that is smaller than 40 mesh, severe blinding of the screens occurred.

SUMMARY OF THE INVENTION

The present invention solves these problems by providing a method for classifying dry polymer beads according to size by the following steps:
a. feeding the beads to a screening zone equipped with at least one screen having at least its upper surface composed of a material, which has a dielectric constant similar to that of the polymer, and having openings of the desired size,
b. passing the beads across the upper surface of the screen, and
c. passing at least a portion of the beads through the openings.

It has been found that as a result of either step (a) or step (b) or a combination of steps (a) and (b) that the beads are substantially free of a charge of static electricity and the portion that passes through the screen described in step (a) does so without significantly blinding the openings.

DESCRIPTION OF THE PREFERRED EMBODIMENTS OF THIS INVENTION

The types of polymers particularly applicable to this invention comprise any of the polymerizable ethylenic monomers, i.e., those that can be polymerized under suspension polymerization conditions to produce a substantially spherical or bead particle. More particularly, the invention is applicable to polymers of the vinyl aromatic monomers which include, in addition to styrene which is preferred, paramethylstyrene, metaethylstyrene, propylstyrene, ethyl-methylstyrene, orthochlorostyrene, para-chlorostyrene, divinylbenzenes such as paradivinylbenzene and vinyl-naphthalene. The polymers also include vinyl aromatic compounds copolymerized with other materials such as vinyl esters, including vinyl chloride and vinyl acetate; esters of unsaturated acids including methyl acrylate, methyl methacrylate and allyl cinnamate; unsaturated hydrocarbons and their halogen derivatives including butadiene, isobutylene and chloroprene; aliphatic alpha-beta unsaturated acids, their anhydrides or esters including maleic anhydride, diethyl maleate and diethyl fumarate.

Figure 1:
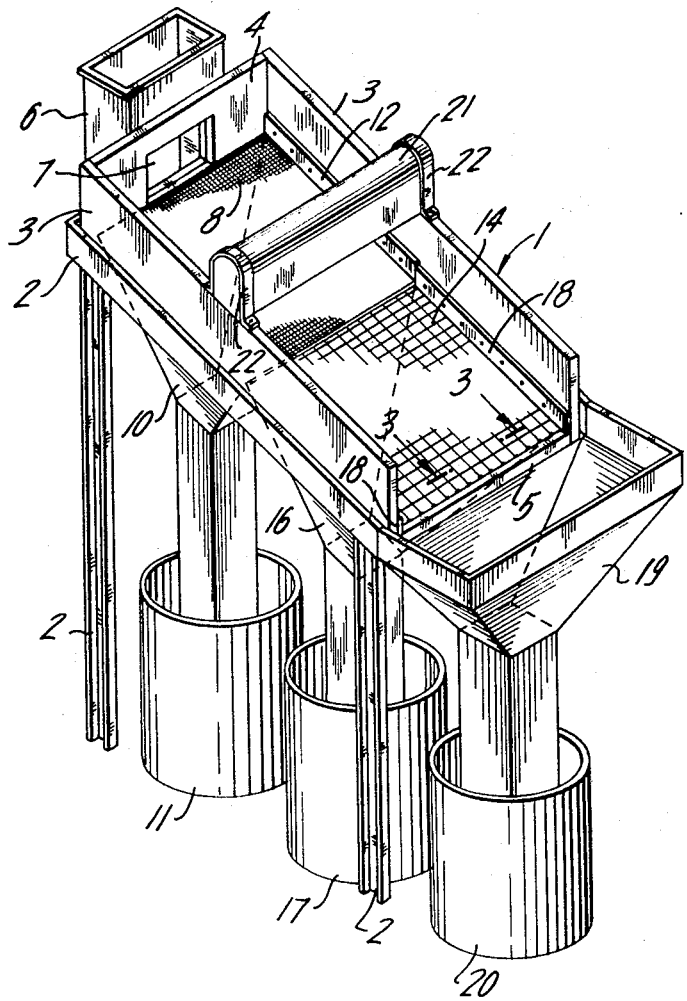
FIG. 1 represents a perspective view of one type of screening apparatus that can be used in conjunction with the method of the present invention.

The screening zone of the method of this invention comprises at least one screen and preferably two screens which include one through which the undersized beads pass and the other on which the oversized beads are retained. The screens can be positioned in series as illustrated in FIG. 1 and described below. Alternatively, the coarse mesh screen can be placed over the fine mesh screen similar to that described in Burrough, U.S. Pat. No. 3,485,364 Ser. No. 614,947, filed Feb. 9, 1967).

The fine mesh screen and optionally the coarse mesh screen as well that are employed in the screening zone have at least their upper surfaces composed of a special type of material. This material has a dielectric constant that is similar to the polymer of which the beads are comprised. The screens themselves can be composed of this material, but for reasons of strength the screens are generally composed of steel wire or similar metal having their entire surface coated with the material of proper dielectric constant. For example, polystyrene has a dielectric constant at 60 cycles per second of 2.5 to 2.7 as indicated in the Tenth Edition of Lange's Handbook of Chemistry, page 849. The type of material suitable for the surface coating of the screens to classify polystyrene should have a dielectric constant in the range of about 2 to 3. Therefore, one can see that the average of the difference between the dielectric constant of the material suitable for surface coating the screens and that of polystyrene is about ±0.5, which exemplifies the degree of the similarity required between the surface material and the polymer. Materials within this range of dielectric constants include but are not limited to fluorinated hydrocarbons such as fluorinated ethylene-propylene copolymer, poly (tetrafluoroethylene or poly (chlorotrifluoroethylene). The latter two materials have dielectric constants at 60 constants per second of 2.1 for the PTFE and 2.6 for the CTFE, respectively, as indicated on page 92 of Materials in Design Engineering, Feb. 1967.

The polystyrene beads which are classified in a preferred embodiment of the present invention can be prepared by any of the known prior art suspension polymerization processes which are also sometimes designated as pearl polymerization, bead polymerization or granular polymerization. In suspension polymerization, a styrene monomer or other polymerizable vinyl aromatic as described above is dispersed in an immiscible liquid, e.g., water, with either an inorganic or organic suspending agent and polymerized generally in the presence of a free-radical initiator. Suitable suspending agents include tricalcium phosphate, hydroxyethyl cellulose, carboxymethyl cellulose, polyvinyl alcohol, soluble acrylic acid polymers, talc bentonite and the like. The free-radical initiators are generally low-temperature organic peroxides such as benzoyl peroxide, caproyl peroxide, lauroyl peroxide, t-butyl peroctoate, cyclohexanone peroxide, decanoyl peroxide azo-bis-isobutyronitrile and the like. The polymerization reaction is usually carried out in a stirred, jacketed autoclave. The resulting polymer product is in the form of small beads generally in the range from about 10 to 100 mesh or finer as determined by U.S. Standard Screens. The beads are then washed to remove the suspending agent and dried to less than about 0.5 percent moisture. The beads are then classified in accordance with the present invention.

The suspension polymerization process outlined above can be operated with procedures and at conditions well known in the art. For example, the initial polymerization temperature may range from about 70° to 95° C. and the temperature can be continually increased to a temperature within the range of about 100° to 145° C. to complete the polymerization. The initial polymerization temperatures, for example, can be maintained for about 1 to 8 hours and the final temperatures can be maintained for a period of 1 to 5 hours. Details of one suspension polymerization process which is suitable to prepare beads of the type that are classified by the method of the present invention can be found by referring to Grim, U.S. Pat. No. 2,673,194.

Figure 2:
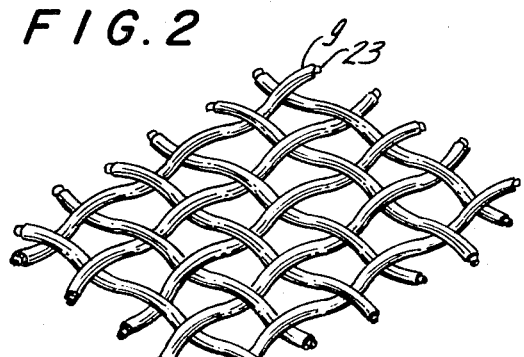
FIG. 2 represents a fragmentary perspective view illustrating details of fine mesh screen 8 of FIG. 1.
Figure 3:
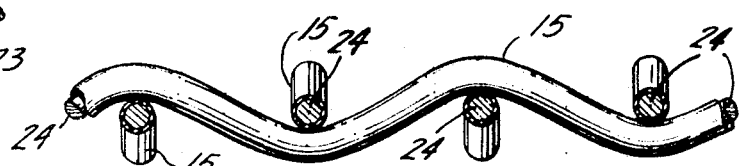
FIG. 3 represents an enlarged detailed vertical sectional view 3—3 taken through a portion of coarse mesh screen 14 of FIG. 1.

Referring now to the drawing and particularly to FIG. 1, there is shown classifier 1 which has been modified in accordance with the present invention. Classifier 1 is mounted on frame 2 in such a manner to give classifier 1 some inclination, for example, 15° to 30°, above the horizontal. Classifier 1 comprises sidewalls 3, back 4 and front bracing 5. Feed chute 6 is mounted on back 4 in order to feed polymer beads having an average particle size from about 10 to 100 mesh and containing less than 0.2 percent moisture through opening 7 in feed chute 6. Fine mesh screen 8 is coated with layer 9 as shown in FIG. 2 of a material having a similar dielectric constant to that of polystyrene, e.g., poly (tetrafuloroethylene) sold under the trade mark Teflon. The size of the openings in screen 8 permit the beads of 40 mesh and smaller to pass through the openings to hopper 10 and then into undersized beads or fines container 11. Fine mesh screen 8 is mounted between sidewalls 3 by means of screen support bar 12. After the fines have been removed, the remaining feed drops onto oversized or coarse mesh screen 14 which is coated with layer 15 of Teflon as shown in FIG. 3. The size of the openings in screen 14 permit beads having a size of 20 mesh and smaller to pass through screen 14 to hopper 16 and then into product container 17. Coarse mesh screen 14 is mounted between sidewalls 3 by means of screen support bar 18. The remaining oversized beads or coarse material is removed from screen 14, dropped to hopper 19 and then into coarse beads container 20. Classifier 1 is vibrated within the confines of frame 2 by means of vibrating motor 21 held down at each of its ends by means of clamps 22 and driven by means not shown. Specific details of one example of a vibrating-screen classifier can be found by referring to Gisler et al., U.S. Pat. No. 2,723,032.

FIG. 2 represents an enlarged detailed view of a portion of fine mesh screen 8 showing the poly (tetrafluorethylene) coating 9 on steel wire mesh 23. Fine mesh screen 8 can be provided with a coarse backing wire mesh (not shown) in order to give this screen added strength and to increase its resiliency.

FIG. 3 represents an enlarged detailed view of the vertical sectional view 3—3 taken through a portion of coarse mesh screen 14 showing the poly (tetrafluorethylene) coating 15 on steel wire mesh 24. Thus screen 8 and screen 14 are identical except for the size of the openings.

The following examples will serve to further illustrate the method of this invention.

EXAMPLE 1

Polystyrene beads were fed to classifier 1 at a rate of 2.3 pounds per square feet of screen cross-sectional area per minute. The beads had the following U.S. Standard Mesh Screen Analysis:

| MESH SIZE | weight PERCENT |
|---|---|
| On 20 | 2.6 |
| On 30 | 20.9 |
| On 35 | 33.2 |
| On 40 | 24.0 |
| On 45 | 12.4 |
| On 50 | 4.7 |
| Through 50 | 2.2 |
| Total | 100.0 |

The screens of classifier 1 were placed at a 20° angle from the horizontal. The coarse mesh screen of classifier 1 was composed of a 22-mesh bolting cloth with about 0.001 inch of Teflon coating so that the final openings in the screen were 0.036 inch. For comparison purposes, a U.S. Standard 20-mesh opening is 0.0331 inch. The cross-sectional area of the coarse mesh screen was 5.83 square feet. The fine mesh screen was composed of a 36-mesh bolting cloth with 0.001 inch of Teflon coating so that the final openings in the fine mesh screen were 0.0193 inch. A U.S. Standard 40-mesh opening is 0.0165 inch. The cross-sectional area of this fine mesh screen was also 5.83 square feet. It is conventional practice with sloped screens to use screen openings that are larger than the point of separation required because the angle of inclination makes the effective size of the openings smaller.

Both screens were operated with no buildup of static electricity. The resulting classification resulted in fines in amount of 35.0 percent based on the weight of the total feed, 62.5 weight percent product and 2.5 weight percent coarse beads. The product had the following U.S. Standard Mesh Screen Analysis:

| MESH SIZE ta | WEIGHT PERCENT |
|---|---|

| | |
|---|---|
| On 18 | 0 |
| On 20 | 4.2 |
| On 25 | 12.4 |
| On 30 | 41.3 |
| On 35 | 30.5 |
| On 40 | 8.0 |
| On 45 | 1.0 |
| On 50 | 0.4 |
| On 60 | 0.1 |
| Through 60 | 1.8 |
| Total | 99.7 |

EXAMPLE 2

Example 1 was repeated except that the screen was increased to an angle of 25° from horizontal. The screens in this example were also operated free of a buildup of static electricity. The classification resulted in 24.2-weight-percent fines, 71.0-weight-percent product and 4.8-weight-percent coarse beads. The product had the following U.S. Standard Mesh Screen Analysis:

| MESH SIZE | WEIGHT PERCENT |
|---|---|
| On 18 | 0 |
| On 20 | 2.0 |
| On 25 | 8.3 |
| On 30 | 36.3 |
| On 35 | 31.4 |
| On 40 | 16.7 |
| On 45 | 2.5 |
| On 50 | 0.7 |
| On 60 | 0.1 |
| Through 60 | 2.3 |
| Total | 100.3 |

EXAMPLE 3 (Controls)

A first control test ran with a classifier similar to classifier 1 except that the fine mesh screen had final openings of 0.0197 inch which is equivalent to U.S. Standard 35-mesh openings and the screen was not coated with Teflon. In addition, the coarse mesh screen had final openings of 0.036 inch which is equivalent to U.S. Standard 19-mesh openings and the screen was not Teflon coated. The unit was operated at an angle of 20° from horizontal which was the same as in example 1 at a feed rate of 6 pounds per square foot per minute. The fine mesh screen was found to become severely blinded resulting in the shutdown of the operation.

In a second control test a backup coarse screen was placed under the fine mesh screen to increase the amount of bounce imparted to the beads by this screen and the angle of the screens were increased to 30° from the horizontal. However, little improvement in screen blinding of the fine mesh screen was noted.

A third control test was conducted using a screen having rectangular slots to classify the beads that were larger than 40 mesh from those that were smaller than 40 mesh without the use of Teflon coating with the screens at a 30° angle from the horizontal. The fine mesh screen blinded badly, A high buildup of static electricity was noted with the beads adhering to each other and to the sidewalls causing the beads to flow over the sides of the classifier and adhering between the openings of the fine mesh screen itself.

It was observed during these three control runs that the coarse mesh screen gave no trouble either due to a buildup of static electricity or due to blinding of the screen. It has been established by the runs that a criticality exists between beads that are larger than 20 mesh, those that pass through about 20-mesh openings and those that pass through about 35- to 40-mesh openings. It is apparent that if all the beads fed to the classifier were large enough to be retained on the 35- to 40-mesh screen then one merely has to screen out the oversized material having a size larger than 20 mesh in order to meet one of the common size specifications for processes using such beads as in foamable bead processes. HOwever, this is not generally the case. Since spheres are the hardest shapes to classify, especially when the major portion of them have approximately the same size as the screen openings, they tend to wedge within the openings of the screens causing mechanical blinding. Therefore, it is quite unexpected that the method of this invention improves and in many cases makes it possible to screen dry, substantially spherical beads of a polymer such as polystyrene which contain at least a portion of fines which is smaller than 35 to 40 mesh.

EXAMPLE 4

In this example a Teflon-coated fine mesh screen containing square openings of 50 mesh, i.e., 0.0117 inch, was used in the same test unit as used in the control example 3 with the screen set at an angle of 30° from the horizontal. No static electricity was noted, no blinding of the screens was noted and the beads did not have the tendency to climb over the sides as in the control examples.

This test was rerun at an angle of 20° from horizontal with no static buildup and only a small amount of mechanical blinding due to the low angle of the screen and the low level of vibration imparted to the screens. These tests indicate that the angle of the screens should be about 20° or above from horizontal in order to obtain maximum screening efficiency.

To summarize the findings of these examples, when one operated the classifier containing fine mesh screens having openings that varied between about 35 to 50 mesh per inch without Teflon coating, the screens blinded badly and the beads had a tendency to skate across the fine mesh screen and to drop onto the coarse mesh screen. This resulted in their passing through the coarse mesh screen and being recovered with the product. In fact, after continuous operation the buildup of static electricity became so great that the beads actually climbed over the sides of the screening unit resulting in losses of material. However, when the fine mesh screen was coated with no more than about 0.001 inch of poly (tetrafluoroethylene), the problem was solved with no appreciable buildup of static electricity, little or no blinding of the screens, negligible contamination of the product by fines, and no loss of product due to beads climbing over the walls of the classifier. In addition to the use of at least a Teflon-coated fine mesh screen in the classifier to prevent a buildup of static electricity as the beads pass across the upper surface of the screen, it has been found that the beads should be held in the feed chute for at least 1 to 2 minutes and then allowed to flow onto the screens, not to drop from a height, in order to prevent the beads from entering the screening zone electrostatically charged.

Although only certain specific embodiments of this invention have been illustrated, it would be obvious to one having ordinary skill in the art to make variations in the method of this invention and still come within the scope of the appended claims.

What is claimed is: What is claimed is:

1. A method classifying dry polymer beads containing a portion thereof having a particle size of less than 20 mesh which comprises the following steps:
   a. holding said beads in a feed chute for at least 1 minute;
   b. feeding said beads to a screening zone equipped with at least one screen
      having openings of the desired size and
      having at least its surface composed of a material which
         has a dielectric constant in the range of about 2 to 3
         which is within about ±0.5 of the dielectric constant of
         said polymer, by means of an opening in said feed chute adjacent one of said screens;

c. passing said beads across the upper surface of said screen; and d. passing said portion of said beads through said openings, whereby as a result of step (a) and/or step (b) and/or step (c) said beads are substantially free of a charge of static electricity and said portion passes without significantly blinding said openings.

2. The method of claim 1 wherein said beads are composed of polymers of vinyl aromatic compounds.

3. The method of claim 2 wherein said beads are composed of polystyrene.

4. The method of claim 1 wherein said screen has at least its surface composed of a hydrocarbon consisting of poly (chlorotrifluoroethylene), fluorinated ethylene-propylene copolymer or poly (tetrafluoroethylene.

5. A method for classifying dry, substantially spherical polystyrene beads having an average particle size in the range from about 10 to 100 mesh which comprises the following steps:

a. holding said beads in a feed chute for at least 1 minute, b. feeding said beads to a screening zone equipped with at least one screen having openings of the desired size and having at least its surface composed of a fluorinated hydrocarbon having a dielectric constant in the range of about 2 to 3, by means of an opening in said feed chute adjacent one of said screens, c. passing said beads across the upper surface of said screen; and d. passing a portion of said beads having a particle size less than 35 mesh through said openings.

6. The method of claim 5 wherein said screen has at least its surface composed of a fluorinated hydrocarbon consisting of poly (chlorotrifluoroethylene), fluorinated ethylene-propylene copolymer or poly (tetrafluoroethylene).

7. A method for classifying dry, substantially spherical polystyrene beads having an average particle size in the range from about 10 to 100 mesh which comprises the following steps:

a. holding said beads in a feed chute for at least 1 minute, b. feeding said polystyrene beads to a screening zone equipped with a fine mesh screen coated with poly (tetrafluoroethylene) and having openings in the range between about 35 and 60 U.S. Standard mesh and a coarse mesh screen having openings of about 20 U.S. Standard mesh by means of an opening in said feed chute immediately adjacent said fine mesh screen;

c. passing said beads across the upper surface of said fine mesh screen;

d. passing a portion of said beads through said openings in said fine mesh screen;

e. passing the remaining portion of said beads onto said coarse mesh screen; and f. recovering a portion of said beads through said coarse mesh screen.

* * * * *